US008364730B2

(12) United States Patent
Arakawa

(10) Patent No.: US 8,364,730 B2
(45) Date of Patent: Jan. 29, 2013

(54) DATA STORAGE APPARATUS AND DATA STORAGE METHOD

(75) Inventor: Tadashi Arakawa, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 963 days.

(21) Appl. No.: 12/300,789

(22) PCT Filed: May 11, 2007

(86) PCT No.: PCT/JP2007/060179
§ 371 (c)(1),
(2), (4) Date: Nov. 13, 2008

(87) PCT Pub. No.: WO2007/135967
PCT Pub. Date: Nov. 29, 2007

(65) Prior Publication Data
US 2009/0132620 A1    May 21, 2009

(30) Foreign Application Priority Data

May 18, 2006  (JP) .................................. 2006-138781

(51) Int. Cl.
 *G06F 12/00* (2006.01)
 *G06F 17/30* (2006.01)
 *G06F 17/00* (2006.01)
(52) U.S. Cl. ......... 707/824; 707/613; 707/621; 711/103
(58) Field of Classification Search .................. 707/821, 707/822, 823, 824, 613, 620; 711/103
See application file for complete search history.

(56) References Cited

U.S. PATENT DOCUMENTS

| | | | |
|---|---|---|---|
| 5,029,125 A * | 7/1991 | Sciupac ................................. | 1/1 |
| 5,422,762 A * | 6/1995 | Jerbic ............................. | 360/48 |
| 5,537,636 A * | 7/1996 | Uchida et al. .......................... | 1/1 |
| 6,219,750 B1 * | 4/2001 | Kanamaru et al. ............. | 711/113 |
| 6,823,417 B2 * | 11/2004 | Spencer ......................... | 710/305 |
| 6,882,493 B2 * | 4/2005 | Denda et al. .................... | 360/69 |
| 7,103,713 B2 * | 9/2006 | Saika et al. .................... | 711/112 |

(Continued)

FOREIGN PATENT DOCUMENTS

| | | |
|---|---|---|
| EP | 1416379 | 5/2004 |
| EP | 1585135 | 10/2005 |

(Continued)

OTHER PUBLICATIONS

Chinese Office Action from Chinese Patent Application No. 200780018136.3 dated Oct. 19, 2010.

(Continued)

*Primary Examiner* — Jeffrey A Burke
(74) *Attorney, Agent, or Firm* — Beyer Law Group LLP

(57) ABSTRACT

In response to a write command with regard to an FAT1 area received from a host device, the data storage apparatus collectively records management information with regard to the FAT1 area simultaneously with duplicate management information of identical content as management information with regard to an FAT2 area at consecutive addresses. In response to a write command with regard to the FAT2 area received from the host device subsequent to the write command with regard to the FAT1 area, the data storage apparatus notifies the host device of completion of data writing without recording the management information with regard to the FAT2 area. This arrangement effectively enhances the data writing efficiency in the data storage apparatus having multiple records of identical management information.

14 Claims, 11 Drawing Sheets

U.S. PATENT DOCUMENTS

| | | | | |
|---|---|---|---|---|
| 7,181,611 B2* | 2/2007 | Chang et al. | | 713/100 |
| 7,260,612 B2* | 8/2007 | Inagaki | | 709/213 |
| 7,444,460 B2* | 10/2008 | Nakanishi et al. | | 711/103 |
| 7,487,303 B2* | 2/2009 | Song et al. | | 711/154 |
| 7,577,643 B2* | 8/2009 | Dominowska et al. | | 1/1 |
| 7,650,458 B2* | 1/2010 | Rogers et al. | | 711/103 |
| 7,693,882 B2* | 4/2010 | Lee et al. | | 707/634 |
| 7,734,603 B1* | 6/2010 | McManis | | 707/696 |
| 7,752,412 B2* | 7/2010 | Tomlin et al. | | 711/170 |
| 7,877,569 B2* | 1/2011 | Honda | | 711/202 |
| 7,953,950 B2* | 5/2011 | Fujimoto | | 711/170 |
| 2001/0051954 A1* | 12/2001 | Yamashita | | 707/200 |
| 2002/0103907 A1* | 8/2002 | Petersen | | 709/226 |
| 2002/0144029 A1* | 10/2002 | Duggan | | 710/36 |
| 2002/0181136 A1* | 12/2002 | Denda et al. | | 360/69 |
| 2003/0081525 A1* | 5/2003 | Yoneyama et al. | | 369/59.25 |
| 2003/0093611 A1* | 5/2003 | Schulze et al. | | 711/103 |
| 2003/0218925 A1* | 11/2003 | Torjussen et al. | | 365/200 |
| 2004/0078704 A1 | 4/2004 | Malueg et al. | | |
| 2004/0128269 A1* | 7/2004 | Milligan et al. | | 707/1 |
| 2004/0250172 A1* | 12/2004 | Patel et al. | | 714/42 |
| 2005/0044300 A1* | 2/2005 | Kimura et al. | | 710/313 |
| 2005/0149493 A1* | 7/2005 | Yamashita et al. | | 707/2 |
| 2005/0182892 A1* | 8/2005 | Nakanishi et al. | | 711/103 |
| 2005/0240803 A1* | 10/2005 | Saika et al. | | 714/5 |
| 2006/0224819 A1* | 10/2006 | Ito | | 711/103 |
| 2006/0253616 A1* | 11/2006 | Sato | | 710/5 |
| 2006/0277333 A1* | 12/2006 | Sim et al. | | 710/62 |
| 2007/0033364 A1* | 2/2007 | Maeda et al. | | 711/170 |
| 2007/0100893 A1* | 5/2007 | Sanders | | 707/200 |
| 2007/0186041 A1* | 8/2007 | Swasdee | | 711/115 |
| 2008/0109589 A1 | 5/2008 | Honda | | |

FOREIGN PATENT DOCUMENTS

| | | |
|---|---|---|
| JP | 4-106643 | 4/1992 |
| JP | 7-64841 | 3/1995 |
| JP | 11-242564 | 9/1999 |
| JP | 11-249968 | 9/1999 |
| JP | 2003-217237 | 7/2003 |
| JP | 2005-216119 | 8/2005 |
| WO | 2005/106673 | 11/2005 |
| WO | WO 2005/106673 | 11/2005 |

OTHER PUBLICATIONS

International Search Report dated Jul. 31, 2007 from International Application No. PCT/JP2007/060179.

European Search Report dated Oct. 6, 2010 from European Application No. 07743614.5.

Japanese Notice of Reason for Rejection from Japanese Patent Application 2006-138781 dated Oct. 26, 2010.

Office Action dated Dec. 26, 2011 from Taiwanese Application No. 96117256.

* cited by examiner

DATA STORAGE APPARATUS AND DATA STORAGE METHOD

TECHNICAL FIELD

The present invention relates to a technique of recording data transferred from a host device into a data storage apparatus.

BACKGROUND ART

There are various storages, for example, a hard disk drive, a memory card, and a USB flash drive as the data storage apparatus that stores data used by a host device, such as a computer. A file system called FAT is generally applied to such data storage apparatuses. The FAT file system provides a management area called a file allocation table in the data storage apparatus to manage the location of each recorded data. The file allocation table records management information provided for each file as a management object. The management information is generally cluster chain information representing the structure and a storage location of each file.

Since the information recorded in the file allocation table is of great importance, two file allocation tables of the identical contents are generally provided in the data storage apparatus. Even when one of the file allocation tables is somehow damaged, normal data reading and data writing operations are ensured by the use of the other file allocation table (see JP-A-H11-249968).

In the data storage apparatus adopting this file system, it is required to update the contents of the file allocation table a large number of times in the case of writing a large number of small files. Such frequent update of the file allocation table undesirably lowers the writing efficiency. In the data storage apparatus using the multiple file allocation tables, information of identical content is to be written multiple times. This further lowers the writing efficiency. This problem is not unique to the FAT file system but is commonly found in data storage apparatuses adopting any file systems requiring two or more records of identical management information, as well as the data storage apparatus adopting the FAT file system.

DISCLOSURE OF THE INVENTION

By taking into account this problem of the prior art, there would be a demand for improving the data writing efficiency in a data storage apparatus having multiple records of identical management information.

In order to accomplish at least part of the demand mentioned above and other relevant demands, one aspect of the invention is directed to a data storage apparatus that stores data transferred from a host device. The data storage apparatus comprises: a storage device that has a data area where the data is recorded and a management area where first management information used for management of the data and second management information of identical content with the first management information are recorded; a receiving unit that individually receives the data, the first management information, and the second management information transferred from the host device in a predetermined order; a data recording unit that records the received data into the data area; and a management information recording unit that, in response to reception of one management information out of the first management information and the second management information from the host device, records the received management information into the management area as the first management information and as the second management information without waiting for reception of the other management information.

In response to reception of one management information out of the first management information and the second management information having the identical contents from the host device, the data storage apparatus according to this aspect of the invention records the received management information as both the first management information and the second management information into the management area of the storage device without waiting for reception of the other management information. This arrangement enhances the recording efficiency of the management information used for management of the data and thus improves the overall data writing efficiency by the host device.

In one preferable application of the data storage apparatus according to the above aspect of the invention, in response to reception of the other management information, the management information recording unit notifies the host device of completion of recording without recording the other management information into the management area.

The data storage apparatus of this application immediately sends back a response representing completion of writing the second management information to the host device. The host device is thus promptly freed from the writing operation of the management information and is allowed to start another process (for example, data writing operation) immediately.

In another preferable application of the data storage apparatus according to the above aspect of the invention, the management information recording unit records the first management information and the second management information at consecutive locations in the management area.

The data storage apparatus of this application enables two pieces of management information having the identical contents to be collectively written into the storage device by only one writing operation. This arrangement effectively enhances the writing efficiency.

In one preferable embodiment of the invention, the data storage apparatus has multiple storage devices. The management information recording unit records the first management information into one of the multiple storage devices, while recording the second management information into another of the multiple storage devices.

The data storage apparatus of this embodiment enables the two pieces of management information having the identical contents to be written simultaneously into the multiple storage devices. This arrangement effectively improves the writing efficiency. The data storage apparatus equipped with only one IC package including multiple storage devices, for example, multiple flash memories is recognizable as the data storage apparatus having multiple storage devices. The data storage apparatus with a mode of using one storage device in a divided manner as multiple storage devices is also recognizable as the data storage apparatus having multiple storage devices.

In one preferable application of the data storage apparatus of the above embodiment, the data recording unit records the data into the multiple storage devices in a distributive manner.

The data storage apparatus of this application enables the data received from the host device to be recorded in a distributive manner into the multiple storage devices in parallel or simultaneously. This arrangement further enhances the writing efficiency.

In another preferable application of the data storage apparatus of the above embodiment, the data recording unit records the data into one of the multiple storage devices, while recording correction data used for correction of the data into another of the multiple storage devices.

The data storage apparatus of this application enables the data read from one storage device to be corrected with the correction data. This arrangement desirably improves the data reading reliability.

In the data storage apparatus of this application, it is preferable that the data recording unit records ECC data obtained by hamming coding the data as the correction data.

The ECC data is used to check and correct an error arising in the data read from one storage device.

In the data storage apparatus of the above application, it is also preferable that the data recording unit records duplicate data of identical content with the data as the correction data.

The data storage apparatus of this arrangement readily checks an error by simply comparing the data as a reading object with the correction data. Even in the occurrence of an error in one data, the other error-free data is used to ensure successful and normal data reading.

In one preferable embodiment of the data storage apparatus having any of the above arrangements, the management information represents data to be recorded in a file allocation table in an FAT file system.

This arrangement desirably enhances the file writing efficiency in the FAT file system generally using two file allocation tables.

In the data storage apparatus having any of the above arrangements, the storage device may be a non-volatile semiconductor memory.

The use of the non-volatile semiconductor memory actualizes a highly portable small-sized data storage apparatus. Typical examples of the non-volatile semiconductor memory include a NAND flash memory, a NOR flash memory, an EEPROM, and a battery backed-up DRAM. The storage device is not restricted to the semiconductor memory but may be, for example, a hard disk drive.

The data storage apparatus of the above application may be connected with the host device via a USB interface.

The data storage apparatus of the present invention is readily usable by simply connecting the data storage apparatus to a USB port provided in the host device, such as a computer. This arrangement desirably improves the user's convenience. The USB interface used for the connection of the data storage apparatus with the host device is not restrictive but may be replaced by a PCMCIA interface, a serial ATA interface, an IEEE1394 interface, or any of various memory interfaces used for SD memory cards and CompactFlash (registered trademark).

The technique of the invention is not restricted to the data storage apparatus having any of the above arrangements but is also actualized by a data storage method of storing data transferred from a host device into such a data storage apparatus.

BEST MODES OF CARRYING OUT THE INVENTION

Figure 1:
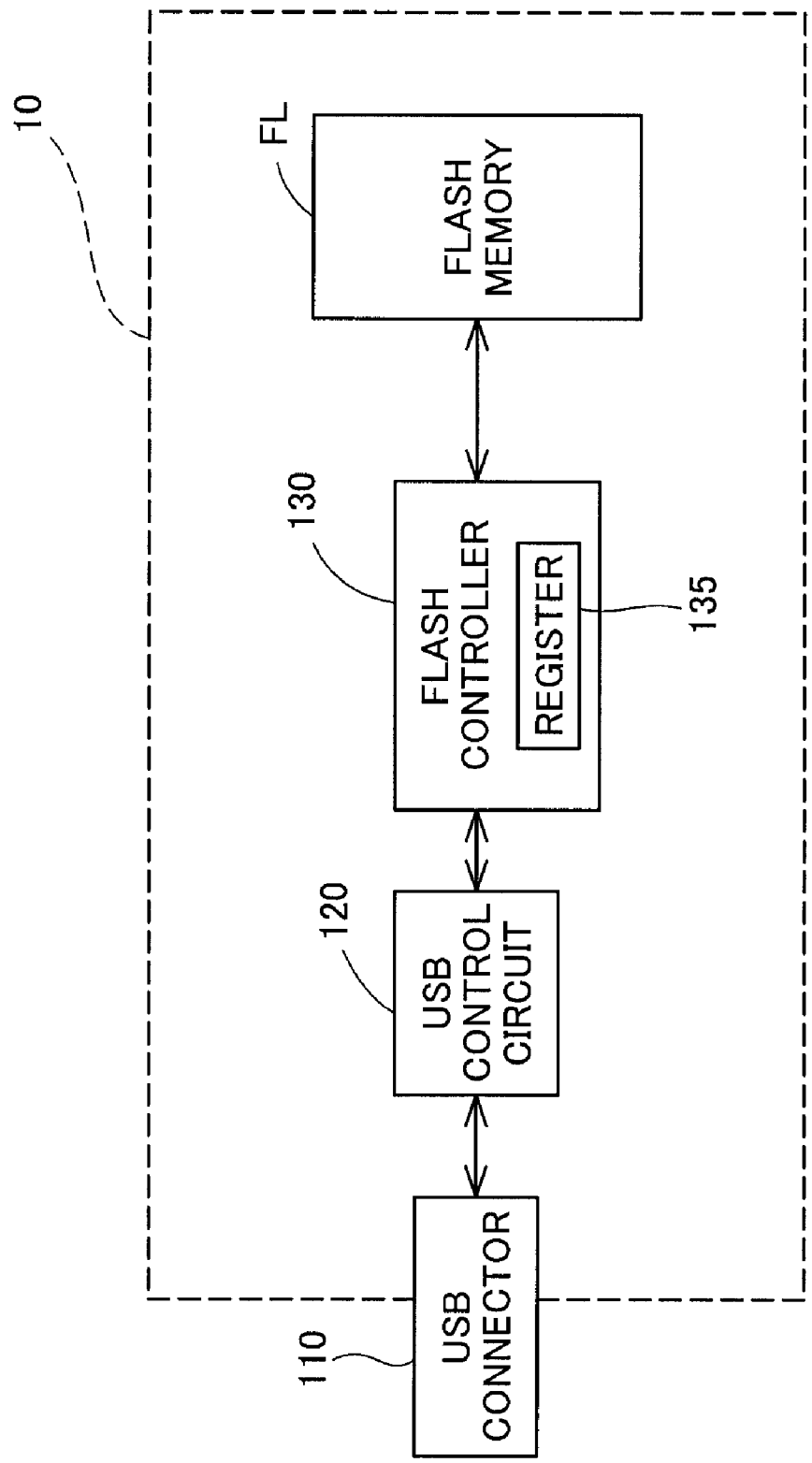
FIG. 1 is an explanatory view showing the schematic configuration of a data storage apparatus in a first embodiment.

In order to elucidate the functions, the advantages, and the effects of the invention, some modes of carrying out the invention are described below in the following sequence as preferred embodiments:

A. First Embodiment
(A1) General Configuration of Data Storage Apparatus
(A2) Outline of Operations of Data Storage Apparatus
(A3) Processing Details (Main Process, Pointer Setting Process, Write/Read Processes)
(A4) Effects
B. Second Embodiment
C. Third Embodiment
D. Modifications A. First Embodiment (A1) General Configuration of Data Storage Apparatus FIG. 1 is an explanatory view showing the schematic configuration of a data storage apparatus 10 in a first embodiment. As illustrated, the data storage apparatus 10 of the embodiment includes a USB connector 110, a USB control circuit 120, a flash controller 130, and a flash memory FL.

The USB connector 110 is exposed on a casing of the data storage apparatus 10 (expressed by a broken line rectangle in the drawing) and is connected to a USB interface provided in a host device, such as a personal computer or a printer.

The USB control circuit 120 is connected with the USB connector 110 and with the flash controller 130. The USB control circuit 120 causes the data storage apparatus 10 to work as a USB mass storage class device and controls communication of the data storage apparatus 10 with the host device according to a USB protocol. The USB control circuit 120 also has the functions of converting a USB command received from the host device into an ATA command and converting data or a status received from the flash controller 130 into USB data. The ATA command is a standardized command by ANSI (American National Standard Institute) and has the general versatility to control data reading and data writing from and to not only the data storage apparatus 10 of the embodiment but diversity of other data storage apparatuses including a hard disk and a PC card memory.

The flash controller 130 is an integrated circuit constructed to interpret the ATA command transferred from the USB control circuit 120 and to control data reading and data writing from and to the flash memory FL. The flash controller 130 internally has a CPU, a ROM, and a RAM for such control. A program for controlling the operations of the data storage apparatus 10 is recorded in the ROM. The CPU uses the RAM as a work area and executes the recorded program to control the general operations of the data storage apparatus 10.

The flash controller 130 has a register 135 arranged to store various address pointers. The flash controller 130 has the function of converting addresses in FAT areas (described later) by referring to these address pointers and thereby enabling efficient reading and writing operations from and into the FAT areas. The details of this function will be explained later.

Figure 2:
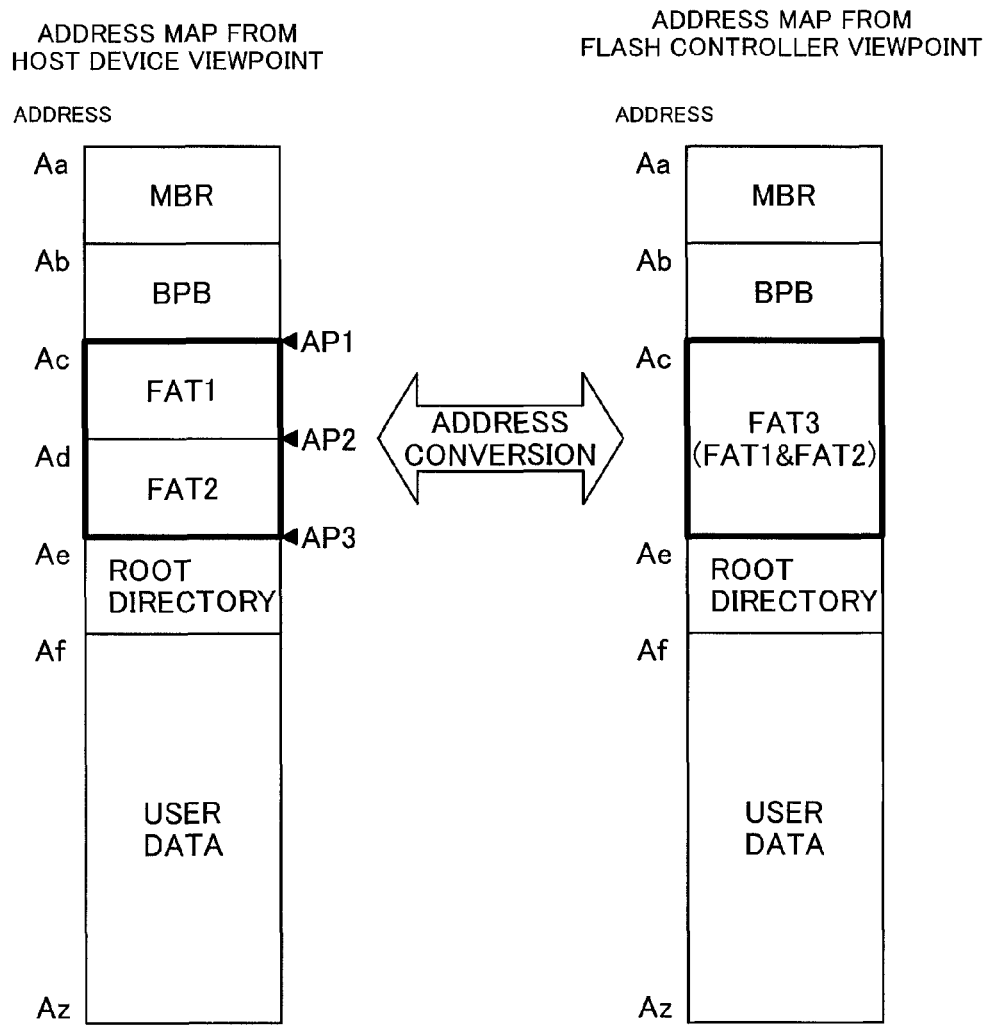
FIG. 2 is an explanatory view showing the data structure in the data storage apparatus.

FIG. 2 is an explanatory view showing the data structure in the data storage apparatus 10. A formatting process performed by the host device according to an FAT file system generates various areas in the data storage apparatus 10 as shown by the left drawing. In a sequence from a head address of the flash memory FL, the generated areas include a master boot record area (hereafter referred to as 'MBR area'), a bios parameter block area (hereafter referred to as 'BPB area'), an FATE area, an FAT2 area, a root directory area, and a user data area.

The MBR area is read first on connection of the data storage apparatus 10 with the host device. Pieces of information including a bootstrap code and a partition table (hereafter these pieces of information are referred to as 'MBR information') are recorded in the MBR area. The partition table stores relevant pieces of information, for example, the number of generated partitions, a starting sector and an end sector of each partition, offsets, and the total number of sectors. The description of this embodiment is on the assumption that only one partition is generated.

The BPB area is provided in a head sector of each partition and stores various pieces of information including a format type of the partition, the number of sectors in the partition, and the number of file allocation tables or FAT (hereafter these pieces of information are referred to as 'BPB information').

Each of the FATE area and the FAT2 area stores management information representing the location of each file recorded in the user data area and a cluster linkage status of the file. Such pieces of the management information are generally referred to as cluster chain information. Management information of identical content is recorded in the FAT1 area and in the FAT2 area for the improved data reliability.

The root directory area stores the file name, the extension, and the attribute of each file recorded in the user data area, as well as a cluster number of a first cluster as a constituent of the file.

In the data storage apparatus 10, the flash controller 130 works to perform address conversion with regard to the FATE area and the FAT2 area among the respective areas explained above and manage the FATE area and the FAT2 area collectively as an FAT3 area as shown in the right drawing of FIG. 2. Namely the host device recognizes the recorded areas according to an address map shown in the left drawing of FIG. 2, while the areas are actually provided in the flash memory FL according to an address map shown in the right drawing of FIG. 2. In the description hereafter, the FATE area, the FAT2 area, and the FAT3 area may collectively be referred to as 'FAT area'.

The flash controller 130 uses address pointers AP1 to AP3 shown in FIG. 2 for address conversion in the FAT area. These address pointers are recorded in the register 135 of the flash controller 130. As illustrated, the address pointer AP1 indicates a head address Ac of the FATE area, and the address pointer AP2 indicates a head address Ad of the FAT2 area. The address pointer AP3 indicates a head address Ae of the root directory area. The flash controller 130 refers to these address pointers, performs address conversion when an access destination of the host device is either the FATE area or the FAT2 area, and reads and writes data from and into the FAT3 area in the flash memory FL.

Figure 3:
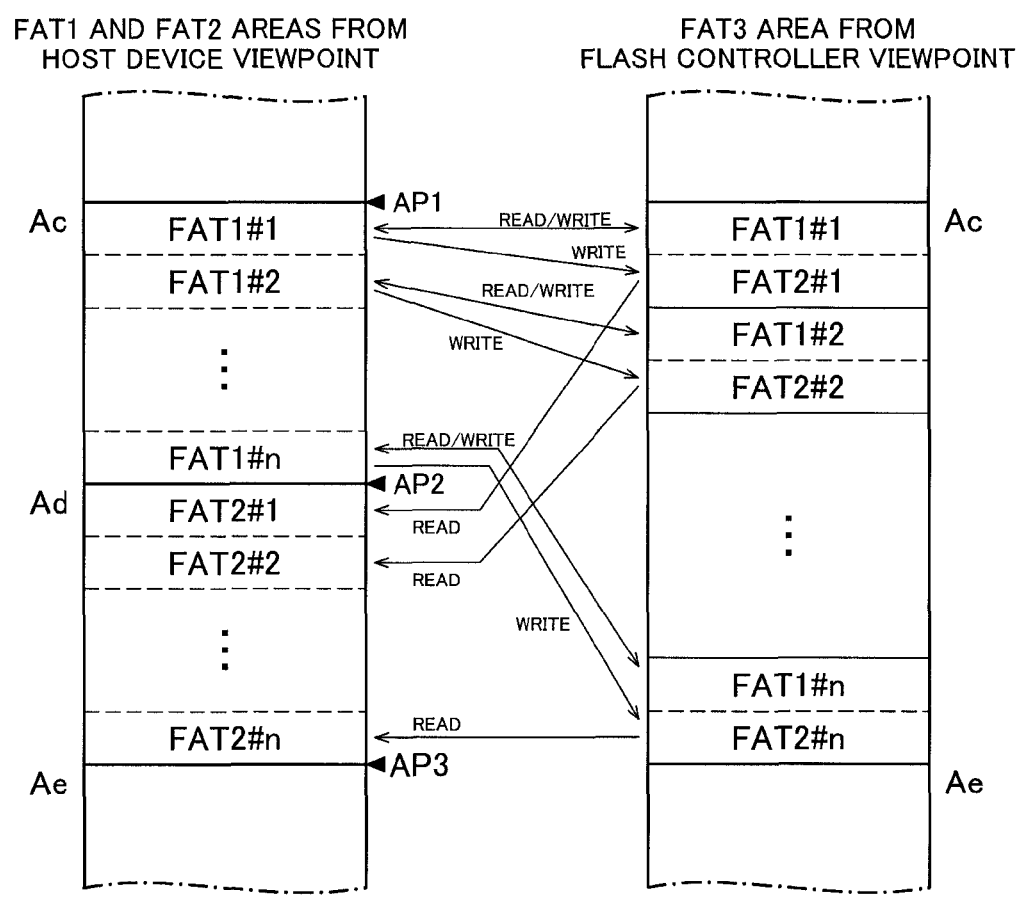
FIG. 3 is an explanatory view showing a correlation of FAT1 and FAT2 areas to an FAT3 area and the outline of reading and writing operations from and into the FAT3 area.

FIG. 3 is an explanatory view showing a correlation of the FATE and FAT2 areas to the FAT3 area and the outline of reading and writing operations from and into the FAT3 area. The left drawing shows the FAT1 area and the FAT2 area from the viewpoint of the host device, while the right drawing shows the FAT3 area from the viewpoint of the flash controller 130. Each piece of management information as a record unit of the FAT area is expressed as '#1', '#2'. Each piece of management information written into the FAT1 area is expressed as 'FAT1#1'.

As shown in the left drawing of FIG. 3, the host device makes access on the assumption that the pieces of management information with regard to the FAT1 area are sequentially recorded in an address range from the address Ac to the address Ad and that the pieces of management information with regard to the FAT2 area are sequentially recorded in an address range from the address Ad to an address Ae-1.

The flash controller 130, on the other hand, alternately arranges the pieces of management information with regard to the FAT1 area and the pieces of management information with regard to the FAT2 area in the FAT3 area as shown by the right drawing of FIG. 3. Namely the flash controller 130 performs address conversion according to Equation (1) given below in response to an access to the FAT1 area, while performing address conversion according to Equation (2) given below in response to an access to the FAT2 area:

$$AD2=AP1+2*(AD1-AP1) \quad (1)$$

$$AD2=AP1+2*(AD1-AP2)+1 \quad (2)$$

In these equations, AD1 and AD2 respectively represent an address accessed by the host device and a converted address after the address conversion.

In response to reception of a write command from the host device to write management information 'FAT1#1' into the FAT1 area shown in the left drawing of FIG. 3, the flash controller 130 writes the management information 'FAT1#1' at an address converted according to Equation (1) given above in the FAT3 area shown in the right drawing of FIG. 3. The flash controller 130 also writes duplicate management information of identical content with the management information 'FAT1#1' at a consecutive address adjacent to the converted address as management information FAT2#1 with regard to the FAT2 area. As mentioned previously, the FAT file system generally writes identical management information into the FAT1 area and the FAT2 area. In response to a write command to write the management information into the FAT1 area, the procedure of the embodiment writes duplicate management information of the identical content into the FAT2 area, prior to reception of a write command with regard to the FAT2 area from the host device. This arrangement completes the writing operations into the FAT1 area and the FAT2 area without receiving a write command with regard to the FAT2 area, thus enabling efficient writing of management information. As explained above, the procedure of the embodiment writes the management information with regard to the FAT1 area and the management information with regard to the FAT2 area at consecutive addresses, thus allowing high-speed writing of management information. In a reading operation of reading management information recorded in the FAT3 area, management information with regard to the FAT1 area or management information with regard to the FAT2 area is read according to Equation (1) or according to Equation (2) given above.

(A2) Outline of Operations of Data Storage Apparatus

Figure 4:
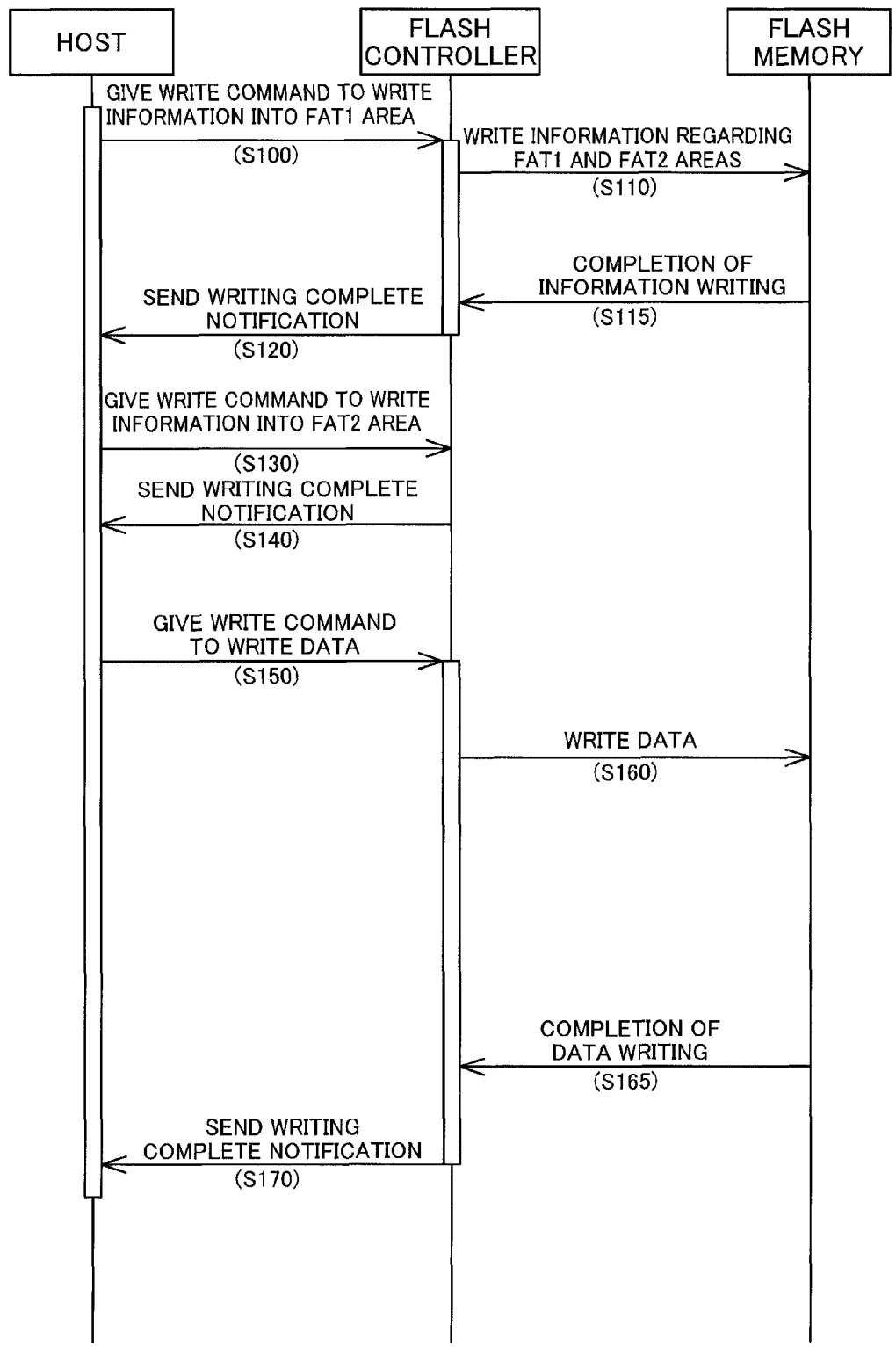
FIG. 4 is an explanatory view showing the outline of operations of the data storage apparatus accompanied with operations of a host device.

FIG. 4 is an explanatory view showing the outline of operations of the data storage apparatus 10 accompanied with operations of the host device. The host device writes a file into the data storage apparatus 10 in the sequence of step (a) of writing management information into the FAT1 area, step (b) of writing management information into the FAT2 area, and step (c) of writing the substance of a file into the user data area. FIG. 4 shows this sequence of operations.

In the file writing procedure, the host device first gives a write command to the data storage apparatus 10 to write management information of a file as a writing object into the FAT1 area (step S100). The host device sends the management information simultaneously with the write command to the data storage apparatus 10.

In response to reception of the write command and the management information, the flash controller 130 of the data storage apparatus 10 writes the received management information at a corresponding address in the FAT3 area corresponding to a specified address in the FAT1 area, and sequentially writes a copy of the received management information at a consecutive address adjacent to the corresponding address (step S110).

A concrete example of the processing at step S110 is explained with reference to FIG. 3. In response to reception of a write command with regard to the FAT1 area from the host device to write management information 'FAT1#1' at the address Ac in the FAT1 area, the data storage apparatus 10 writes the received management information 'FAT1#1' at the address Ac in the FAT3 area corresponding to the address Ac in the FAT1 area. The data storage apparatus 10 also writes duplicate information of identical content with the management information 'FAT1#1' at a consecutive address Ac+1 as information 'FA2#1'. The information 'FAT2#1' is originally to be written at the head address Ad in the FAT2 area. Namely the management information to be written in the FAT1 area and the management information to be written in the FAT2 area are simultaneously and collectively written into the FAT3 area. The data storage apparatus 10 of the embodiment adopts the FAT file system, which records data of identical content into the FAT1 area and the FAT2 area, to write the management information with regard to the FAT2 area simultaneously with the management information with regard to the FAT1 area into the FAT3 area without waiting for reception of a write command with regard to the FAT2 area from the host device.

On completion of writing the management information into the FAT3 area (step S115), the flash controller 130 sends back a writing complete notification representing completion of writing the information into the FAT1 area to the host device (step S120).

In response to reception of the writing complete notification with regard to the FAT1 area from the flash controller 130, the host device subsequently sends a write command with regard to the FAT2 area to the flash controller 130 to write management information into the FAT2 area (step S130). At this moment, however, writing of the management information into the FAT2 area has already been completed at step S110 as explained above. The flash controller 130 thus immediately sends back a writing complete notification with regard to the FAT2 area to the host device, in response to reception of the write command (step S140).

In response to reception of the writing complete notification with regard to the FAT2 area from the flash controller 130, the host device gives a file write command to the flash controller 130 to write the substance of the file as the writing object (step S150). The flash controller 130 then writes the substance of the file into the user data area in the flash memory FL (step S160). On completion of writing the file into the flash memory FL (step S165), the flash controller 130 sends back a writing complete notification representing completion of writing the file to the host device (step S170).

As explained above, the data storage apparatus 10 of the embodiment writes information into the FAT2 area simultaneously with writing information into the FAT1 area. A writing complete notification is thus sent back immediately, in response to reception of a write command with regard to the FAT2 area from the host device. The host device is thus promptly freed from the writing operation into the FAT2 area and immediately starts writing the substantial data.

The procedure of the embodiment writes the substance of a file into the user data area after writing the management information into the FAT1 area and the FAT2 area. This sequence of writing is not essential but may be inverted according to the requirements.

(A3) Processing Details

The series of processing executed by the data storage apparatus 10 to implement the operations shown in FIG. 4 is described below in detail.

(A3-1) Main Process

Figure 5:
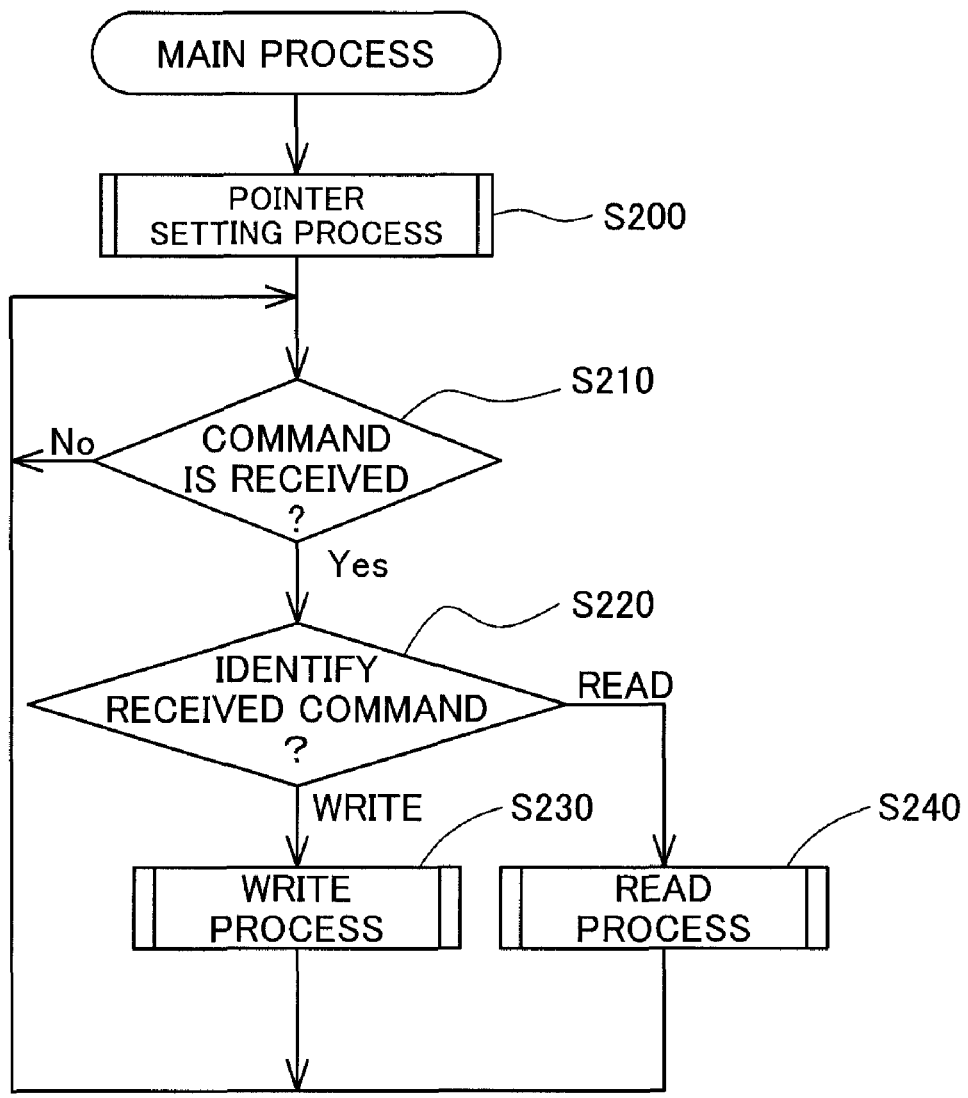
FIG. 5 is a flowchart showing a main process routine.

FIG. 5 is a flowchart showing a main process routine executed by the data storage apparatus 10. The flash controller 130 starts this main process flow simultaneously with connection of the data storage apparatus 10 to the host device and start of power supply to the data storage apparatus 10.

On the start of the main process, the flash controller 130 first performs a pointer setting process to set the values of the address pointers AP1 to AP3 (step S200). The details of the pointer setting process will be explained later.

The flash controller 130 subsequently determines whether any command is received from the host device via the USB control circuit 120 (step S210). When no command is received (step S210: no), the flash controller 130 repeats this decision step to wait for reception of any command. When any command is received (step S210: yes), on the other hand, the flash controller 130 identifies the received command (step S220).

When the received command is identified as a write command for writing data (step S220: 'write'), the flash controller 130 performs a write process described later (step S230). When the received command is identified as a read command for reading data (step S220: 'read'), on the other hand, the flash controller 230 performs a read process described later (step S240). On completion of either the write process or the read process, the main process flow goes back to step S210. The main process repeats the series of processing in response to a command received from the host device until cutoff of the power supply.

(A3-2) Pointer Setting Process

Figure 6:
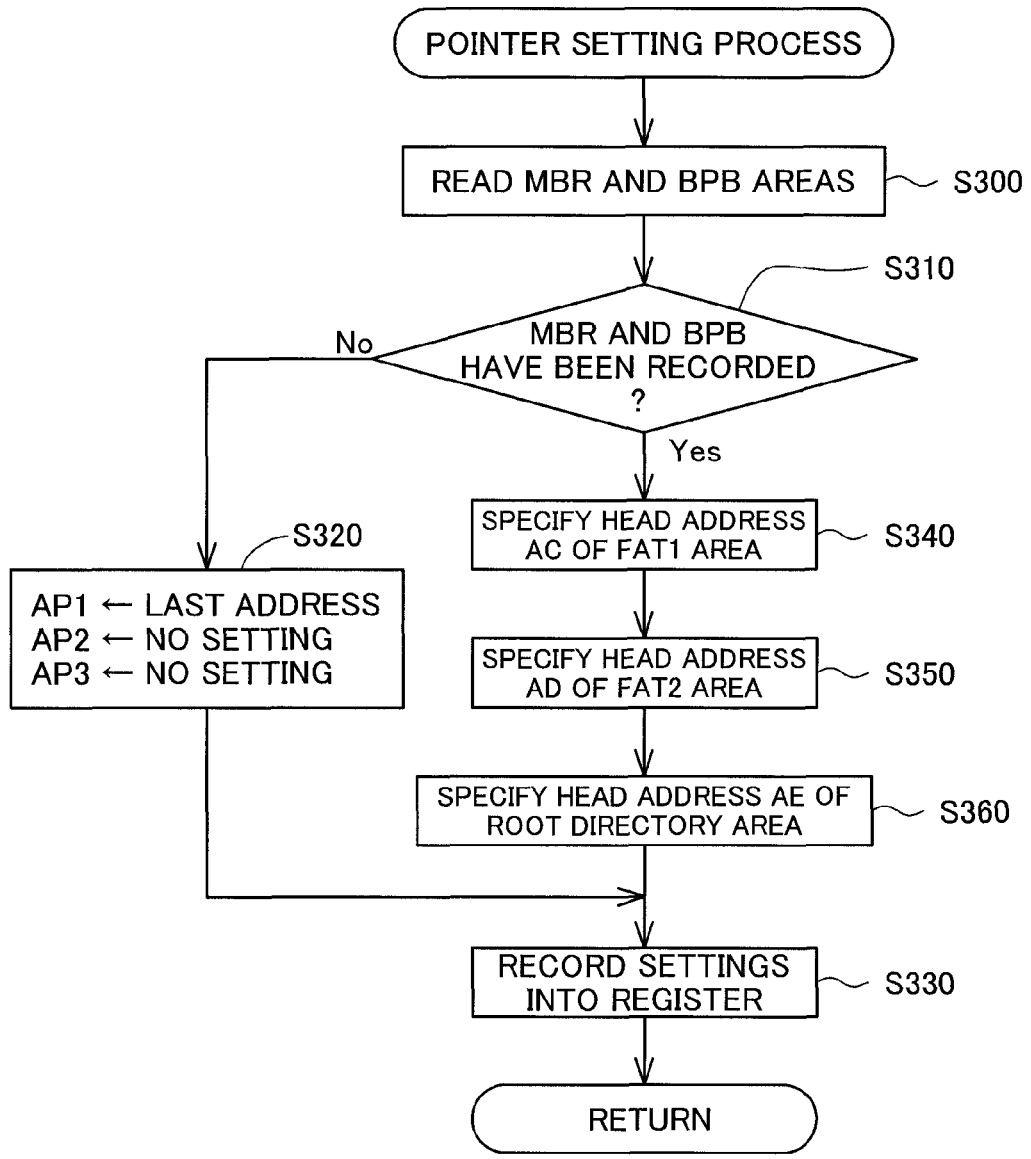
FIG. 6 is a flowchart showing a pointer setting process.

FIG. 6 is a flowchart showing the pointer setting process executed at step S200 in the main process routine. This process is performed at the time of power supply to the data storage apparatus 10 or on completion of formatting the data storage apparatus 10 to set the values of the address pointers AP1 to AP3 shown in FIGS. 2 and 3.

In the pointer setting process, the flash controller 130 first reads the MBR area and the BPB area generated in the flash memory FL (step S300) and determines whether the MBR information and the BPB information have already been written in the MBR area and the BPB area (step S310).

Upon determination that the MBR information and the BPB information have not yet been written (step S310: no), it means that the data storage apparatus 10 has not yet been formatted. The flash controller 130 then sets a last address Az in the flash memory FL to the value of the address pointer APE, while not setting the values of the address pointers AP2 and AP3 (step S320). Such setting of the address pointers AP1 to AP3 leads to no conversion of FAT areas in the subsequent write process or read process. The host device is thus able to normally utilize the data storage apparatus 10 according to another file system, as well as the FAT file system.

After setting the value of the address pointer AP1 at step S320, the flash controller 130 records the setting of the address pointer AP1 into the register 135 (step S330) and terminates the pointer setting process.

Upon determination that the MBR information and the BPB information have already been written (step S310: yes), on the other hand, it means that the data storage apparatus 10 has already been formatted according to the FAT file system. The flash controller 130 then specifies the head address Ac of the FAT1 area according to the information recorded in the MBR area and the BPB area including the partition tables and the number of sectors and sets the specified head address Ac of the FAT1 area to the value of the address pointer AP1 (step S340). The flash controller 130 also specifies the head address Ad of the FAT2 area and sets the specified head address Ad of the FAT2 area to the value of the address pointer AP2 (step S350). The flash controller 130 further specifies the head address Ae of the root director area and sets the specified head address Ae of the root directory area to the value of the address pointer AP3 (step S360). The flash controller 130 records the settings of the address pointers AP1 to AP3 into the register 135 (step S330) and terminates the pointer setting process.

(A3-3) Write Process

Figure 7:
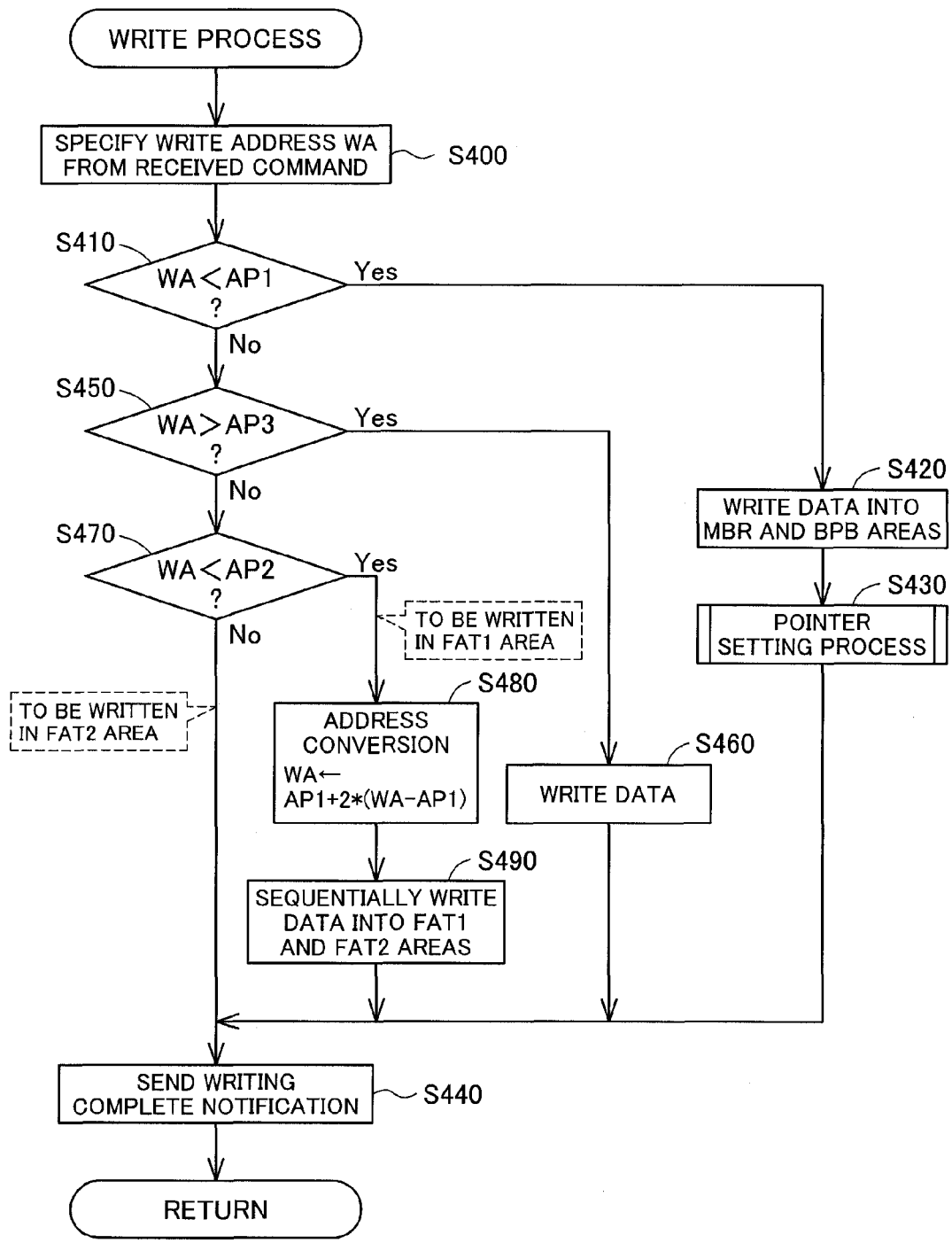
FIG. 7 is a flowchart showing a write process.

FIG. 7 is a flowchart showing the details of the write process executed at step S230 in the main process routine. The write process is performed to write data received from the host device (hereafter referred to as 'writing data') into the flash memory FL.

In the write process, the flash controller 130 first analyzes a write command received from the host device via the USB control circuit 120 and specifies an address of a writing destination (hereafter referred to as 'write address WA') (step S400).

The flash controller 130 subsequently refers to the storage in the register 135 and determines whether the specified write address WA is lower than the address indicated by the address pointer AP1 (step S410). Upon determination that the write address WA is lower than the address indicated by the address pointer AP1 (step S410: yes), it is determinable that the command received from the host device is either a write command of writing the MBR information and the BPB information in the formatting process or a write command according to a file system other than the FAT file system (see FIG. 2). The flash controller 130 accordingly writes the writing data at the write address WA in the flash memory FL without address conversion (step S420).

The MBR information and the BPB information are generally written only once in the formatting process. In the case of writing data at the address lower than the address indicated by the address pointer AP1, the flash controller 130 identifies the potential for the formatting process by the host device and executes the pointer setting process shown in FIG. 6 (step S430). Execution of the pointer setting process enables the address pointers AP1 to AP3 to be set adequately after completion of the formatting process. On completion of the pointer setting process, the flash controller 130 sends back a writing complete notification to the host device (step S440).

Upon determination that the write address WA is not lower than the address indicated by the address pointer AP1 (step S410: no), on the other hand, the flash controller 130 refers to the storage in the register 135 and determines whether the write address WA is higher than the address indicated by the address pointer AP3 (step S450). Upon determination that the write address WA is higher than the address indicated by the address pointer AP3 (step S450: yes), it is determinable that the command received from the host device is a write command of writing data into the root directory area or the user data area (see FIG. 2). The flash controller 130 accordingly writes the writing data at the write address WA in the flash memory FL without address conversion (step S460). On completion of data writing, the flash controller 130 sends back a writing complete notification to the host device (step S440).

Upon determination that the write address WA is lower than the address indicated by the address pointer AP3 (step S450: no), it means that the write address WA indicates an address in either the FATE area or the FAT2 area. The flash controller 130 then refers to the storage in the register 135 and determines whether the write address WA is lower than the address indicated by the address pointer AP2 (step S470). Upon determination that the write address WA is lower than the address indicated by the address pointer AP2 (step S470: yes), it means that the write address WA indicates an address in the FAT1 area. The flash controller 130 then performs the address conversion according to Equation (1) given above as explained previously with reference to FIG. 3 (step S480).

After the address conversion, the flash controller 130 writes the received writing data as management information at the converted address, and sequentially writes data of the identical content as management information at a consecutive address adjacent to the converted address (step S490). The management information to be written in the FAT1 area and in the FAT2 area is thus collectively written into the FAT3 area. On completion of writing the management information into the FAT3 area, the flash controller 130 sends back a writing complete notification to the host device (step S440).

Upon determination that the write address WA is higher than the address indicated by the address pointer AP2 (step S470: no), it means that the write address WA indicates an address in the FAT2 area. The information to be written in the FAT2 area has already been written in the FAT3 area at step S490. The flash controller 130 accordingly does not write data into the flash memory FL at this moment but immediately sends back a writing complete notification to the host device (step S440).

As described above, the write process directly writes the data received from the host device into an area other than the FAT area without address conversion. In response to a write command to write data in the FAT1 area, the write process performs the predetermined address conversion and writes the received data into the FAT3 area. The flash controller 130 writes the information to be written in the FAT2 area, simultaneously with the information to be written in the FAT1 area, into the FAT3 area. This arrangement enhances the writing efficiency of the management information into the flash memory FL.

(A3-4) Read Process

Figure 8:
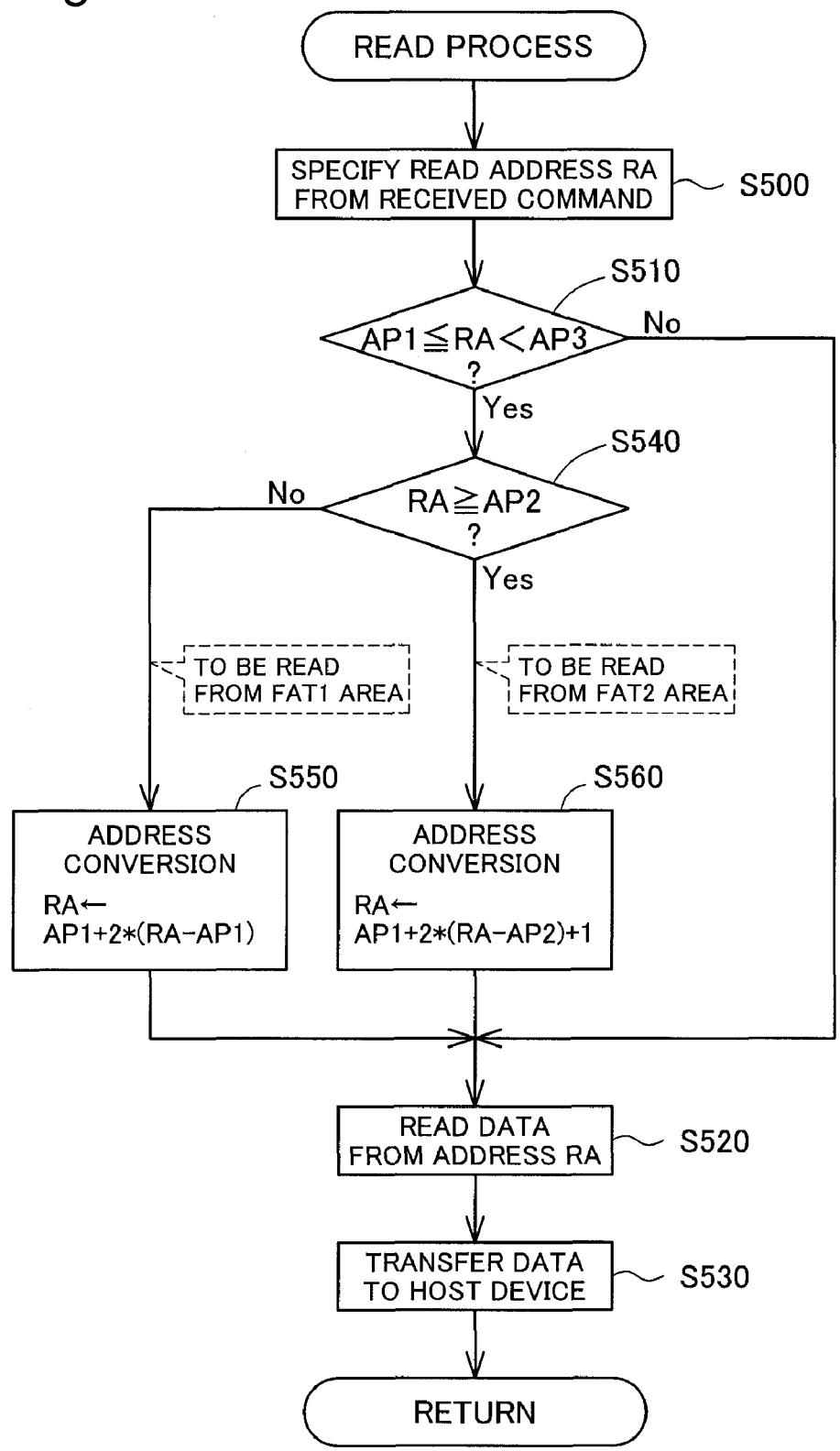
FIG. 8 is a flowchart showing a read process.

FIG. 8 is a flowchart showing the details of the read process executed at step S240 in the main process routine. The read process is performed to read data from the flash memory FL in response to a read command from the host device.

In the read process, the flash controller 130 first analyzes a read command received from the host device via the USB control circuit 120 and specifies an address of a reading source (hereafter referred to as 'read address RA') (step S500).

The flash controller 130 subsequently refers to the storage in the register 135 and determines whether the read address RA is higher than the address indicated by the address pointer AP1 but is lower than the address indicated by the address pointer AP3 (step S510). Upon determination that the read address RA is either lower than the address indicated by the address pointer AP1 or higher than the address indicated by the address pointer AP3 (step S510: no), it means that the read address RA indicates an address in an area other than the FAT area. The flash controller 130 thus directly reads data from the specified read address RA (step S520) and transfers the read data to the host device (step S530).

Upon determination that the read address RA is higher than the address indicated by the address pointer AP1 but is lower than the address indicated by the address pointer AP3 (step S510: yes), on the other hand, it means that the read address RA indicates an address in either the FAT1 area or the FAT2 area (see FIG. 2). The flash controller 130 additionally determines whether the read address RA is higher than the address indicated by the address pointer AP2 (step S540). Upon determination that the read address RA is lower than the address indicated by the address pointer AP2 (step S540: no), it means that the read address RA indicates an address in the FAT1 area. The flash controller 130 then performs the address conversion according to Equation (1) given above (step S550) and reads data from the converted address (step S520). This enables the flash controller 130 to adequately read management information with regard to the FAT1 area from the FAT3 area. The flash controller 130 transfers the data read from the FAT3 area to the host device (step S530).

Upon determination that the read address RA is higher than the address indicated by the address pointer AP2 (step S540: yes), it means that the read address RA indicates an address in the FAT2 area. The flash controller 130 then performs the address conversion according to Equation (2) given above (step S560) and reads data from the converted address (step S520). This enables the flash controller 130 to adequately read management information with regard to the FAT2 area from the FAT3 area. The flash controller 130 transfers the data read from the FAT3 area to the host device (step S530).

In the read process explained above, the flash controller 130 directly reads data from an area other than the FAT area and transfers the read data to the host device. In response to a read command to read data from either the FAT1 area or the FAT2 area, the flash controller 130 performs the address conversion, adequately reads management information with regard to the FAT1 area or the FAT2 area from the converted address in the FAT3 area, and transfers the read management information to the host device.

(A4) Effects

As described above, in response to a write command received from the host device to write data in the FAT1 area, the data storage apparatus 10 of the first embodiment writes data with regard to the FAT2 area simultaneously with data with regard to the FAT1 area. In response to a subsequent write command received from the host device to write data in the FAT2 area, the data storage apparatus 10 can thus immediately send back a writing complete notification to the host device. The data storage apparatus 10 of the embodiment collectively writes the management information with regard to the FAT1 area and the management information with regard to the FAT2 area at consecutive addresses in the FAT3 area provided in the flash memory FL. This enables efficient data writing and desirably increases the processing speed. The data storage apparatus 10 of the embodiment adopts the flash memory having a relatively large data writing unit for the storage device. The large data writing unit facilitates the collective writing of two data at consecutive addresses by only one writing operation. Such collective writing significantly enhances the overall processing speed.

B. Second Embodiment

The data storage apparatus 10 of the first embodiment has only one flash memory FL as shown in FIG. 1. A modified structure including two flash memories FL is described below as a second embodiment.

Figure 9:
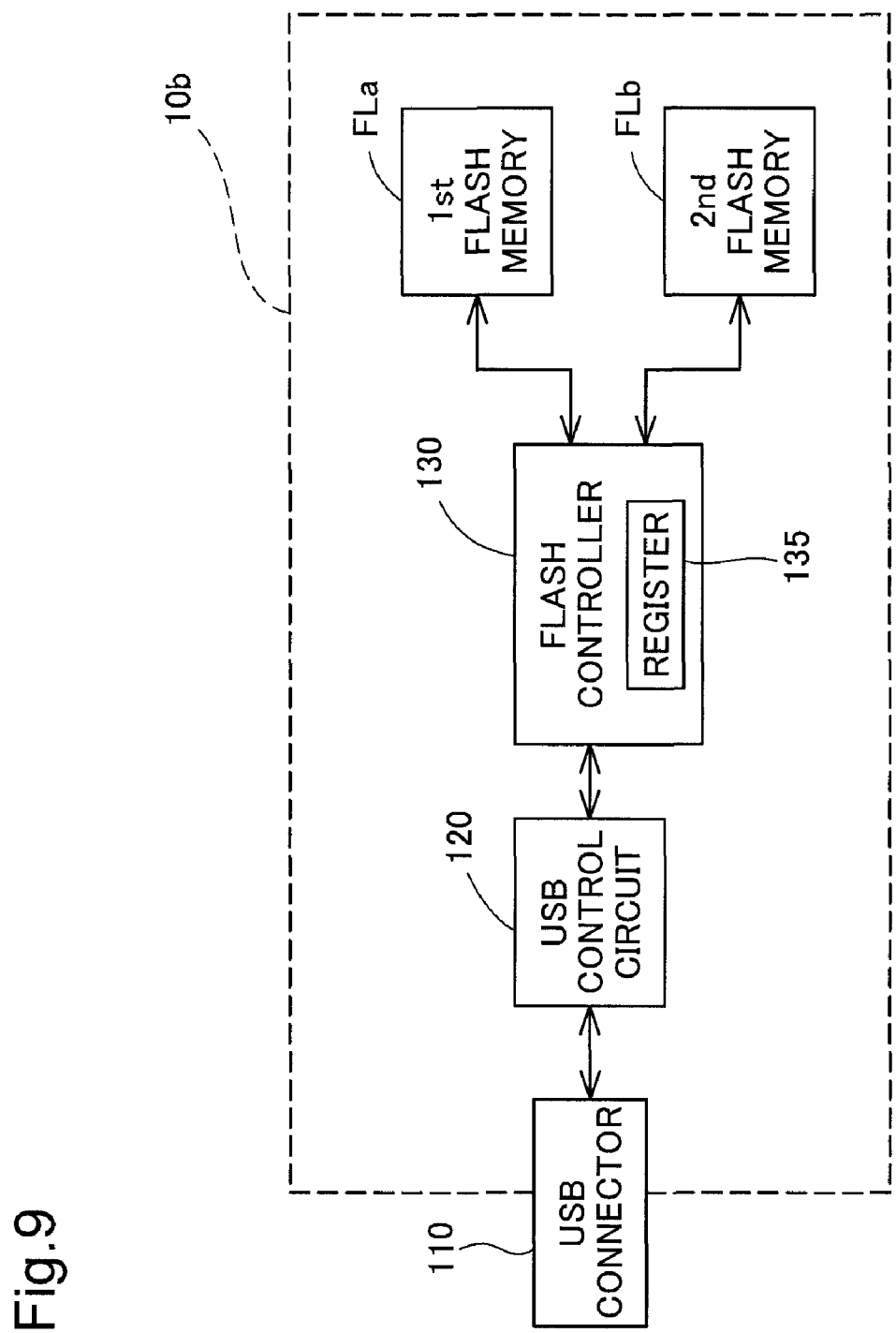
FIG. 9 is an explanatory view showing the schematic configuration of a data storage apparatus in a second embodiment.

FIG. 9 is an explanatory view showing the schematic configuration of a data storage apparatus 10b in the second embodiment. As illustrated, the data storage apparatus 10b of the second embodiment has two flash memories FLa and FLb, in addition to the same components as those of the first embodiment, the USB connector 110, the USB control circuit 120, and the flash controller 130.

Figure 10:
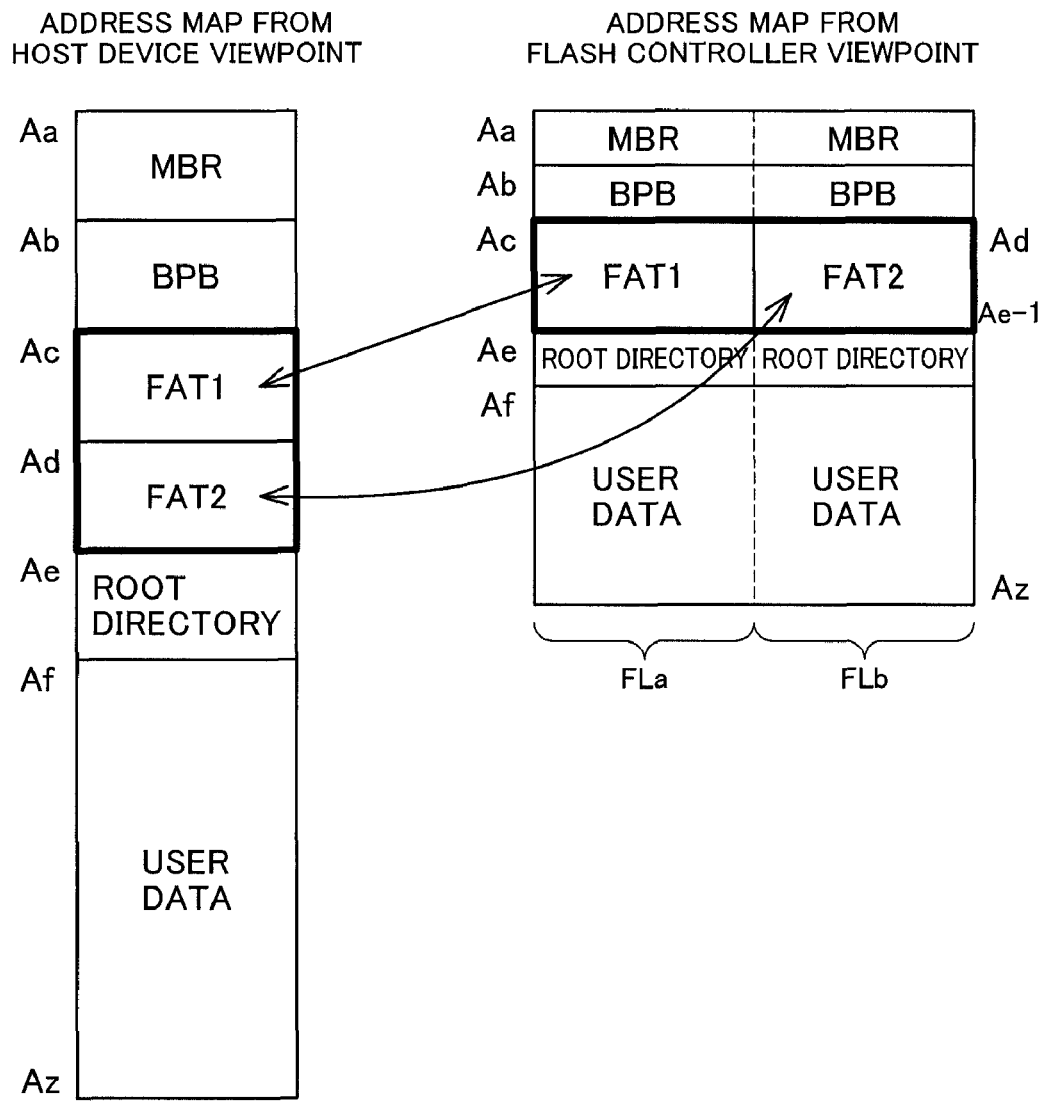
FIG. 10 is an explanatory view showing the data structure in the second embodiment.

FIG. 10 is an explanatory view showing the data structure in the data storage apparatus 10b. The left drawing of FIG. 10 shows an address map of the data storage apparatus 10b from the viewpoint of the host device. This address map is identical with the address map explained in the first embodiment and is thus not specifically described here.

The right drawing of FIG. 10 shows an address map of the two flash memories FLa and FLb. In the data structure of this embodiment, addresses forming address spaces of the respective areas other than the FAT areas, that is, the MBR area, the BPB area, the root directory area, and the user data area are alternately allocated in the sequence of (1) flash memory FLa and (2) flash memory FLb. For example, a first address of the MBR area is allocated to the flash memory FLa, while a second address of the MBR area is allocated to the flash memory FLb. Similarly a third address of the MBR area is allocated to the flash memory FLa, while a fourth address of the MBR area is allocated to the flash memory FLb. Such formation of the address space enables the data storage apparatus 10b to write data into the two flash memories FLa and FLb in parallel (simultaneously). The data storage apparatus 10b of this embodiment has the two flash memories FLa and FLb to substantially double the width of the bus. Parallel (simultaneous) data writing ensures high-speed data reading and data writing.

In the data structure of this embodiment, an FAT1 area is provided in the flash memory FLa, while an FAT2 area is provided in the flash memory FLb. In response to a write command received from the host device to write data into the FAT1 area, the flash controller 130 writes received data into the FAT1 area of the flash memory FLa and simultaneously writes duplicate data of the identical content into the FAT2 area of the flash memory FLb. The data structure of the second embodiment enables the management information to be written into the two flash memories simultaneously or in parallel without waiting for completion of data writing into one of the two flash memories, thus enhancing the writing efficiency into the FAT area as in the first embodiment.

The main process, the pointer setting process, the write process, and the read process executed in the second embodiment are substantially equivalent to those executed in the first embodiment and are not specifically explained here. In the write process of FIG. 7 and the read process of FIG. 8, the procedure of the second embodiment performs preset address conversion according to the address map shown in FIG. 10 and adequately writes and reads data into and from an area other than the FAT area in the flash memory FLa or the flash memory FLb. The procedure of the first embodiment writes management information of identical content at consecutive addresses in the FAT3 area at step S490 in the write process of FIG. 7. The procedure of the second embodiment, on the other hand, writes management information of identical content in parallel or simultaneously into the FATE area provided in the flash memory FLa and into the FAT2 area provided in the flash memory FLb. The procedure of the second embodiment performs address conversion to an address in the FATE area of the flash memory FLa at step S550 and performs address conversion to an address in the FAT2 area of the flash memory FLb at step S560 in the read process of FIG. 8.

C. Third Embodiment

The data structure of the second embodiment causes the data with regard to the area other than the FAT area to be written in a distributive manner in the two flash memories. A data structure of a third embodiment, on the other hand, causes data of identical content with regard to the area other than the FAT area to be written in two flash memories. A data storage apparatus 10b of the third embodiment has the same configuration as that of the data storage apparatus 10b of the second embodiment shown in FIG. 9.

Figure 11:
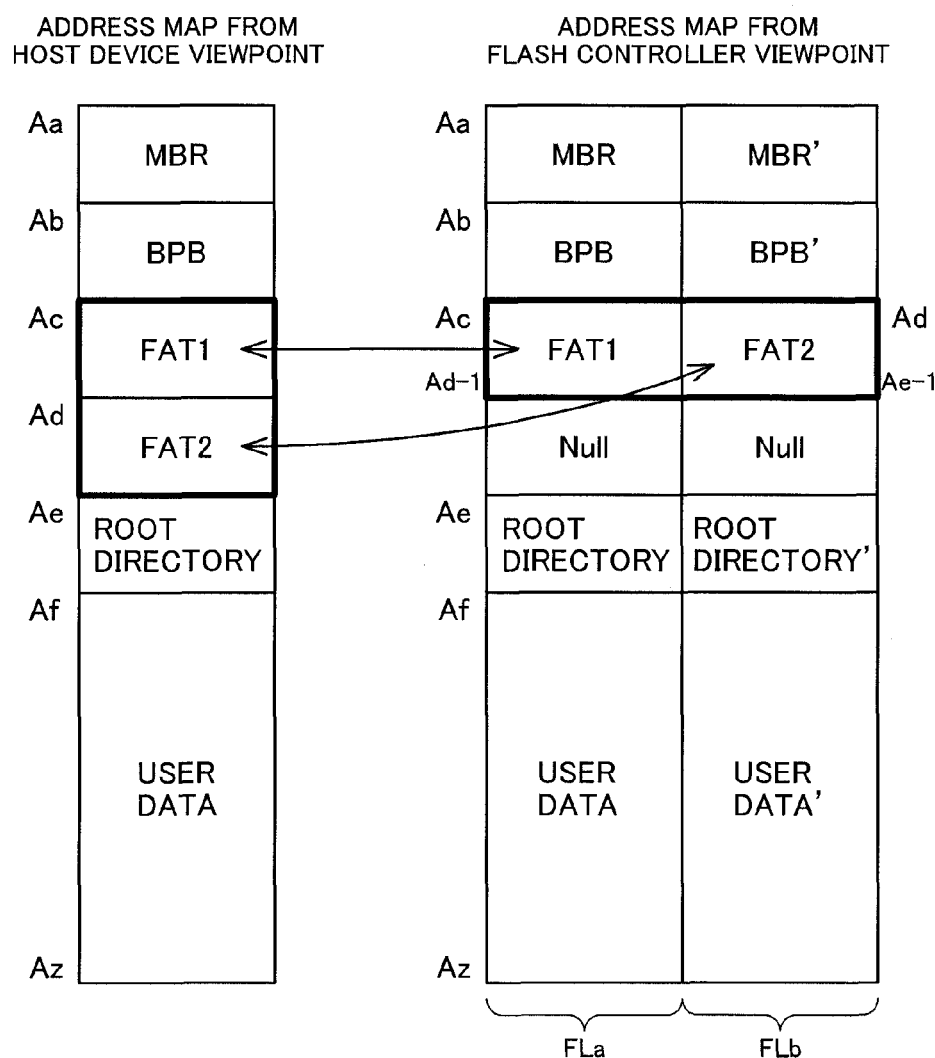
FIG. 11 is an explanatory view showing the data structure in a third embodiment.

FIG. 11 is an explanatory view showing the data structure in the data storage apparatus 10b of the third embodiment. The left drawing of FIG. 11 shows an address map of the data storage apparatus 10b from the viewpoint of the host device. The right drawing of FIG. 11 shows an address map of the two flash memories FLa and FLb. In the data structure of the third embodiment, with regard to the areas other than the FAT areas, that is, the MBR area, the BPB area, the root directory area, and the user data area, data of the identical content is written into the flash memory FLa and into the flash memory FLb. This arrangement desirably increases the redundancy of data stored in the flash memory. Even in the event of damage of data stored in one of the flash memories, this arrangement enables data to be read adequately from the other flash memory.

In the data structure of the third embodiment, an FAT1 area is provided in the flash memory FLa, while an FAT2 area is provided in the flash memory FLb as in the data structure of the second embodiment. The data structure of the third embodiment enables the management information to be written into the two flash memories simultaneously or in parallel without waiting for completion of data writing into one of the two flash memories, thus enhancing the writing efficiency into the FAT area as in the first and the second embodiments.

In the data structure of the third embodiment, as shown in FIG. 11, the address map from the viewpoint of the flash controller 130 is equivalent to the address map from the viewpoint of the host device, with regard to the respective areas other than the FAT2 area. This arrangement enables data to be written into and read from the area other than the FAT2 area without address conversion, thus enhancing the processing efficiency. In the right address map of FIG. 11, a 'Null' area is originally a space for the FAT2 area and is thus not directly recognizable from the host device. A preset address conversion for linking the Null area with the user data area enables the Null area to be utilized as part of the user data area.

In the data structure of the third embodiment, data of the identical content is written into the flash memory FLa and into the flash memory FLb. In one modified data structure, ECC data generated from the data written in the flash memory FLa may be written into the flash memory FLb. This arrangement enables an error of the data written in the flash memory FLa to be easily checked and corrected based on the ECC data written in the flash memory FLb, thus enhancing the reliability of the stored data.

D. Modifications

The embodiments discussed above are to be considered in all aspects as illustrative and not restrictive. There may be many modifications, changes, and alterations without departing from the scope or spirit of the main characteristics of the present invention. Some examples of possible modification are given below.

(D1) Modification 1

The data storage apparatus 10 of the embodiment has a flash memory as the storage device. The flash memory is, however, neither essential nor restrictive but may be replaced by any other suitable storage device, for example, a hard disk drive.

(D2) Modification 2

The data storage apparatus 10 of the embodiment is formatted according to the FAT file system. The FAT file system is, however, neither essential nor restrictive, but any other file system having multiple records of identical management information may be adopted for formatting the data storage apparatus 10.

(D3) Modification 3

In the configuration of the embodiment, the host device and the data storage apparatus 10 are interconnected by the USB interface. The USB interface is, however, neither essential nor restrictive but may be replaced by any other suitable interface adopted for connection, for example, a PCMCIA interface, a serial ATA interface, or an IEEE 1394 interface.

In the description of the embodiments, the data storage location in the flash memory is expressed by the terminology 'address'. This term 'address' is, however, not restrictive but is replaceable with any of equivalent terms, for example, 'sector', 'cluster', or 'block' according to the file system, the operating system, or the storage device adopted.

None of the embodiments, their modifications, and their applications described above is to be interpreted in a restrictive manner. The scope and spirit of the present invention are indicated by the appended claims, rather than by the foregoing description.

The invention claimed is:

1. A data storage apparatus that stores data transferred from a host device, the data storage apparatus comprising:
   a storage device that has a data area where the data is recorded and a management area where first management information used for management of the data and second management information of identical content with the first management information are recorded;
   a receiving unit that individually receives the data, the first management information, and the second management information transferred from the host device in a predetermined order;
   a data recording unit that records the received data into the data area; and
   a management information recording unit that, in response to reception of one management information out of the first management information and the second management information from the host device, records the received management information into the management area as the first management information and as the second management information without waiting for reception of the other management information;

wherein in response to reception of the other management information, the management information recording unit sends back a response representing completion of recording to the host device without recording the other management information into the management area;

wherein the first management information comprises a first file allocation table; and wherein the second management information comprises a second file allocation table.

2. The data storage apparatus in accordance with claim 1, wherein the management information recording unit records the first management information and the second management information at consecutive locations in the management area.

3. The data storage apparatus in accordance with claim 1, the data storage apparatus having multiple storage devices, wherein the management information recording unit records the first management information into one of the multiple storage devices, while recording the second management information into another of the multiple storage devices.

4. The data storage apparatus in accordance with claim 3, wherein the data recording unit records the data into the multiple storage devices in a distributive manner.

5. The data storage apparatus in accordance with claim 3, wherein the data recording unit records the data into one of the multiple storage devices, while recording correction data used for correction of the data into another of the multiple storage devices.

6. The data storage apparatus in accordance with claim 5, wherein the data recording unit records ECC data obtained by hamming coding the data as the correction data.

7. The data storage apparatus in accordance with claim 5, wherein the data recording unit records duplicate data of identical content with the data as the correction data.

8. The data storage apparatus in accordance with claim 1, wherein the management information represents data to be recorded in a file allocation table in an FAT file system.

9. The data storage apparatus in accordance with claim 1, wherein the storage device is a non-volatile semiconductor memory.

10. The data storage apparatus in accordance with claim 9, wherein the non-volatile semiconductor memory is a flash memory.

11. The data storage apparatus in accordance with claim 10, the data storage apparatus being connected with the host device via a USB interface.

12. The data storage apparatus in accordance with claim 1 wherein in said response to reception of the other management information, the management information recording unit sends back the response representing completion of recording to the host device without recording the other management information into the management area, irrespective of whether or not said received of the other management information is empty information.

13. A data storage method of storing data transferred from a host device into a data storage apparatus, the data storage apparatus having a storage device that a data area where the data is recorded and a management area where first management information used for management of the data and second management information of identical content with the first management information are recorded wherein the first management information comprises a first file allocation table and the second management information comprises a second file allocation table, the data storage method comprising:

individually receiving the data, the first management information, and the second management information transferred from the host device in a specific order;

in response to reception of one management information out of the first management information and the second management information from the host device, recording the received management information into the management area as the first management information and as the second management information without waiting for reception of the other management information;

recording the received data into the data area; and sending a response back to the host device representing completion of the recording of the received data without recording the other management information.

14. The data storage method recited in claim 13 wherein in said response to said reception of said one management information out of the first management information and the second management information from the host device, said recording of the received management information into the management area as the first management information and as the second management information without waiting for reception of the other management information and wherein the management information recording unit sends back a response representing completion of recording to the host device without recording the other management information into the management area, irrespective of whether or not the received other management information is empty information.

* * * * *